(12) United States Patent
Kitamura

(10) Patent No.: US 7,165,641 B2
(45) Date of Patent: Jan. 23, 2007

(54) BICYCLE POWER SUPPLY WITH DISCHARGE FUNCTION

(75) Inventor: Satoshi Kitamura, Kitakatsuragi-gun (JP)

(73) Assignee: Shimano, Inc., Sakai (JP)

( * ) Notice: Subject to any disclaimer, the term of this patent is extended or adjusted under 35 U.S.C. 154(b) by 36 days.

(21) Appl. No.: 10/708,891

(22) Filed: Mar. 30, 2004

(65) Prior Publication Data

US 2004/0195025 A1    Oct. 7, 2004

(30) Foreign Application Priority Data

Apr. 1, 2003    (JP)    ............................. 2003-097859

(51) Int. Cl.
*B62M 23/02*    (2006.01)
(52) U.S. Cl. ...................................... 180/206; 180/220
(58) Field of Classification Search ............... 180/65.1, 180/205, 206, 220, 221; 320/103, 104, 134, 320/136
See application file for complete search history.

(56) References Cited

U.S. PATENT DOCUMENTS

| | | | |
|---|---|---|---|
| 5,664,636 A * | 9/1997 | Ikuma et al. ................ | 180/206 |
| 5,798,702 A * | 8/1998 | Okamoto et al. ......... | 340/636.1 |
| 5,806,621 A * | 9/1998 | Soda et al. .................. | 180/206 |
| 5,857,537 A * | 1/1999 | Matsumoto et al. ........ | 180/206 |
| 5,878,831 A * | 3/1999 | Saito et al. .................. | 180/206 |
| 6,039,137 A * | 3/2000 | Schless ........................ | 180/220 |
| 6,066,936 A | 5/2000 | Okamura et al. | |
| 6,247,548 B1 * | 6/2001 | Hayashi et al. ............. | 180/206 |
| 6,260,649 B1 * | 7/2001 | Carney, Jr. .................. | 180/220 |
| 6,418,041 B1 | 7/2002 | Kitamura | |
| 6,452,361 B1 * | 9/2002 | Dougherty et al. ......... | 320/104 |
| 6,545,445 B1 * | 4/2003 | McDermott et al. ........ | 320/103 |
| 6,573,686 B1 * | 6/2003 | Uno ............................ | 320/123 |
| 6,588,528 B1 * | 7/2003 | Ligman ....................... | 180/206 |

FOREIGN PATENT DOCUMENTS

| | | |
|---|---|---|
| DE | 4429693 A1 | 3/1995 |
| DE | 19948798 A1 | 5/2001 |
| EP | 1129930 A2 | 9/2001 |
| EP | 1216916 A2 | 6/2002 |
| GB | 2126438 A | 3/1984 |
| GB | 2161040 A | 1/1986 |
| JP | 09-271102 A | 10/1997 |

OTHER PUBLICATIONS

Patent Abstracts of Japan, vol. 2000, No. 6, dated Sep. 22, 2000, for JP 2000-067614, published Mar. 3, 2000.

* cited by examiner

*Primary Examiner*—Lesley D. Morris
*Assistant Examiner*—L. Lum
(74) *Attorney, Agent, or Firm*—James A. Deland

(57) ABSTRACT

A bicycle power supply apparatus comprises a battery unit; a bicycle condition detecting unit that detects when a bicycle is in a selected condition that ordinarily does not require drawing current from the battery unit for powering a current drawing element; and a current drawing unit that causes current to be drawn from the battery unit when the bicycle condition detecting unit detects the selected condition.

20 Claims, 10 Drawing Sheets

BICYCLE POWER SUPPLY WITH DISCHARGE FUNCTION

BACKGROUND OF INVENTION

The present invention is directed to bicycles and, more particularly, to a bicycle power supply with a discharge function.

Some recent bicycles have been equipped with electronically controllable electrical components such as derailleurs, suspension devices, displays, etc., along with the electrical controllers for such components. A well-known example of this technology is an automatic bicycle transmission that uses a speed sensor to automatically change gears according to bicycle speed. In all cases, a power supply is required to supply electricity to the various electronic components. Sometimes batteries are used for such power supplies. However, batteries need to be replaced when their electricity is consumed, and such replacement places undesirable burdens on the rider. Furthermore, the electrical components may suddenly stop operating when the batteries are depleted, which can be very problematic.

To avoid the above problems, some systems use a rechargeable battery as the power supply, wherein the rechargeable battery may be recharged using an alternating current generator mounted to the bicycle. Such a system is shown in JP 2001-245475. In this system, a rectifier converts current from an alternating current generator to direct current, and the direct current is used to charge a capacitor that functions as a battery unit. The capacitors typically comprise electrolytic or double layer capacitors with relatively large capacities. Power from the capacitor then may be used to operate the various electrical components mounted on the bicycle.

While the use of rechargeable batteries solves some of the problems of single-use batteries, they still have some disadvantages. For example, since bicycles are used outdoors, the temperature of the power supply may increase dramatically when the bicycle is parked under exposure to direct sunlight, and such temperatures may shorten the life of the battery. In order to avoid this problem, protective measures have been taken such as covering the battery with insulating material. However, this increases the size of the battery, thus making it more difficult to install the battery onto the bicycle.

SUMMARY OF INVENTION

The present invention is directed to various features of a bicycle power supply. In one embodiment, a bicycle power supply apparatus comprises a battery unit; a bicycle condition detecting unit that detects when a bicycle is in a selected condition that ordinarily does not require drawing current from the battery unit for powering a current drawing element; and a current drawing unit that causes current to be drawn from the battery unit when the bicycle condition detecting unit detects the selected condition. Additional inventive features will become apparent from the description below, and such features alone or in combination with the above features may form the basis of further inventions as recited in the claims and their equivalents.

DETAILED DESCRIPTION

Figure 1:
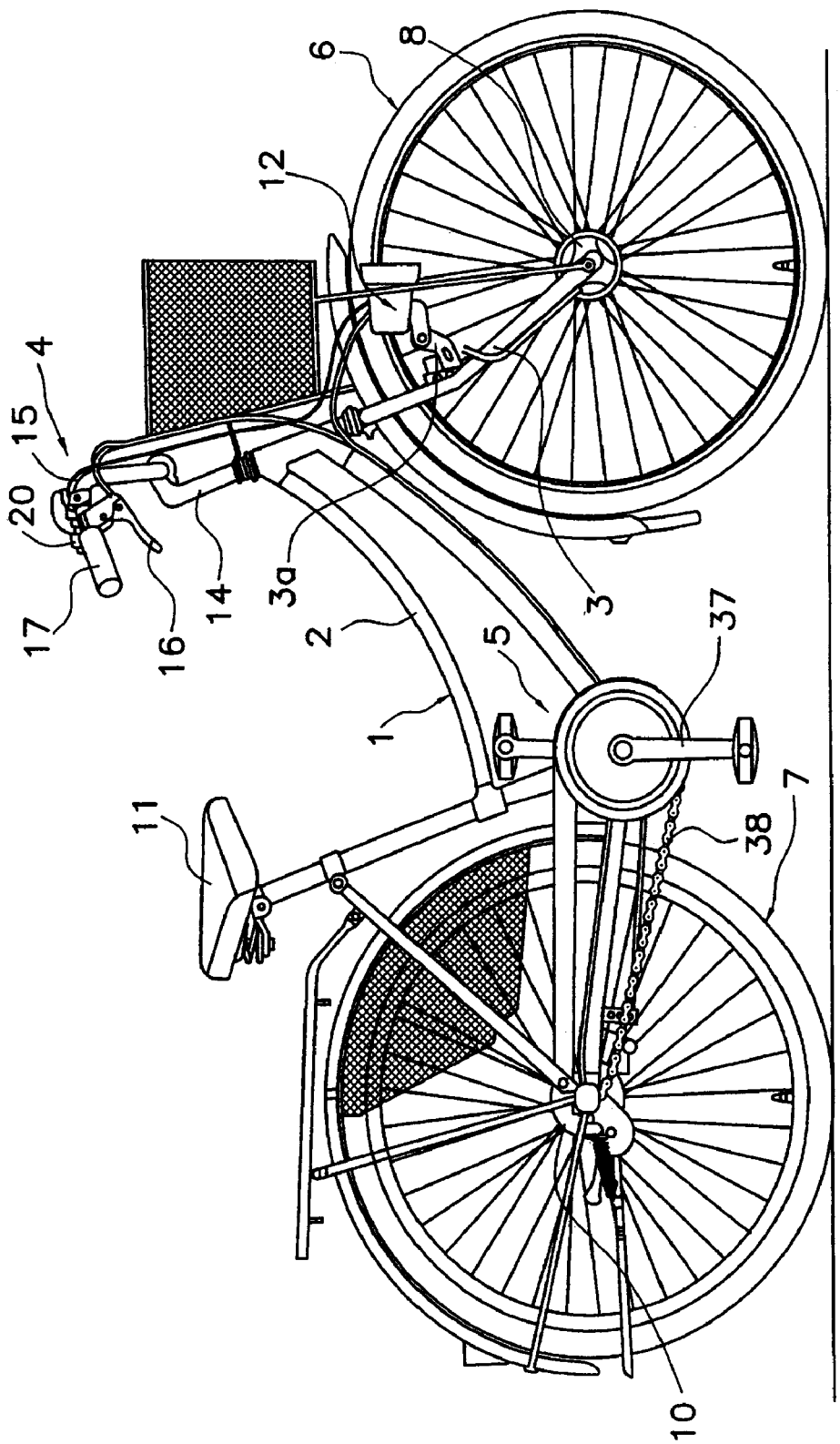
FIG. 1 is a side view of a bicycle that includes a particular embodiment of a power supply.

FIG. 1 is a side view of a bicycle 1 that includes a particular embodiment of a power supply. Bicycle 1 is a light roadster recreational bicycle comprising a double-loop frame body 2 formed from welded tubes, a front fork 3 mounted to the frame body 2 for rotation around an inclined axis, a handlebar assembly 4, a drive component 5, a front wheel 6 on which an alternating current generating dynamo hub 8 with brakes is mounted, a rear wheel 7 on which an internal shifting hub 10 is mounted, a saddle 11, a shift control unit 12 to control shifting of the internal shifting hub 10, and a shift controller 20 for manually operating the shift control unit 12.

Figure 2:
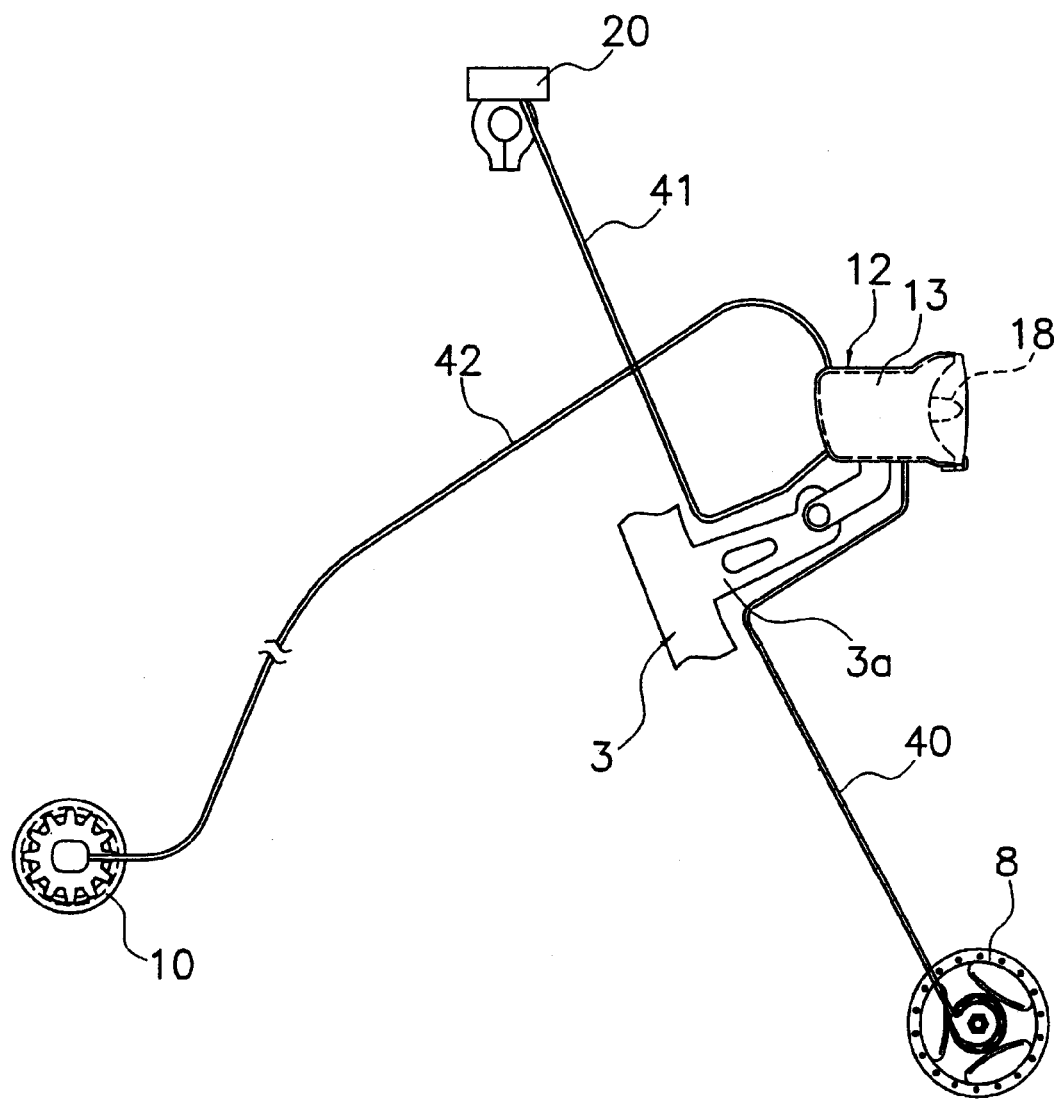
FIG. 2 illustrates how a shift controller, a shift control unit, an alternating current generator and a transmission are coupled together.

The handlebar assembly 4 comprises a handle stem 14, fastened to the upper part of the front fork 3, and a handlebar 15 fastened to the handle stem 14. Brake levers 16 and grips 17 are mounted on both ends of the handlebar 15. In this embodiment, the shift controller 20 is integrated with the right-side brake lever 16. The drive component 5 comprises a crank 37, mounted on the lower part (bottom bracket component) of the frame body 2, and a chain 38 that engages the crank 37 and the internal shifting hub 10. The internal shifting hub 10 is capable of producing three speed steps, including a low speed step (speed 1), an intermediate speed step (speed 2), and a high speed step (speed 3). These three speed steps can be selected by means of a motor unit 29 (FIG. 3) in the shift control unit 12. The dynamo hub 8 of the front wheel 6 can be fitted with a roller-type front brake, and it houses an alternating current generating dynamo (D) 19 (FIG. 6) that generates electricity in response to the rotation of the front wheel 6. As shown in FIG. 2, the shift control unit 12 is electrically connected to the alternating current generating dynamo 19 housed in the dynamo hub 8 by electrical wiring 40, and it is electrically connected to the shift controller 20 by electrical wiring 41. The shift control unit 12 is mechanically connected to the internal shifting hub 10 by a shift control cable 42.

Figure 3:
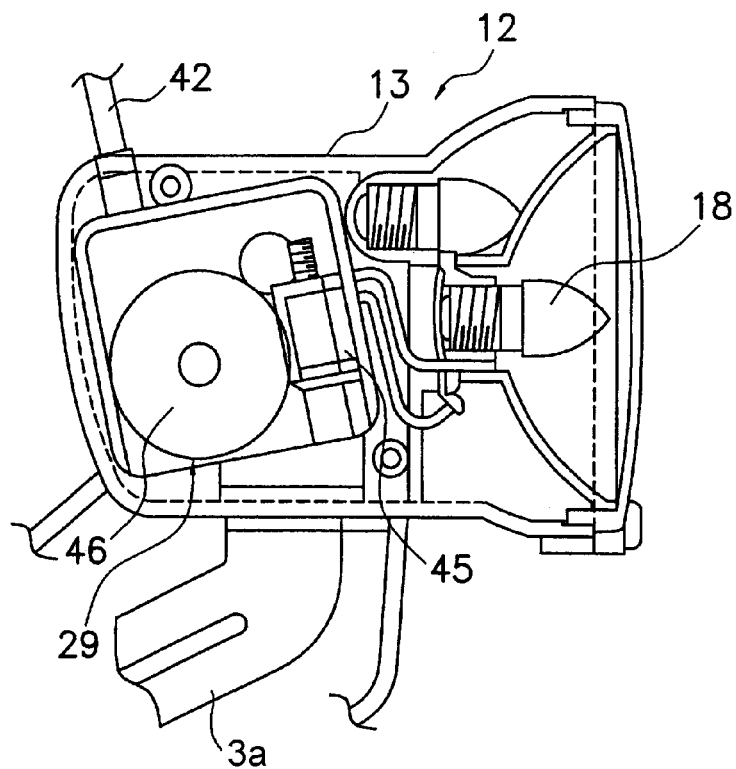
FIG. 3 is a side cross sectional view of the shift control unit shown in FIG. 2.
Figure 4:
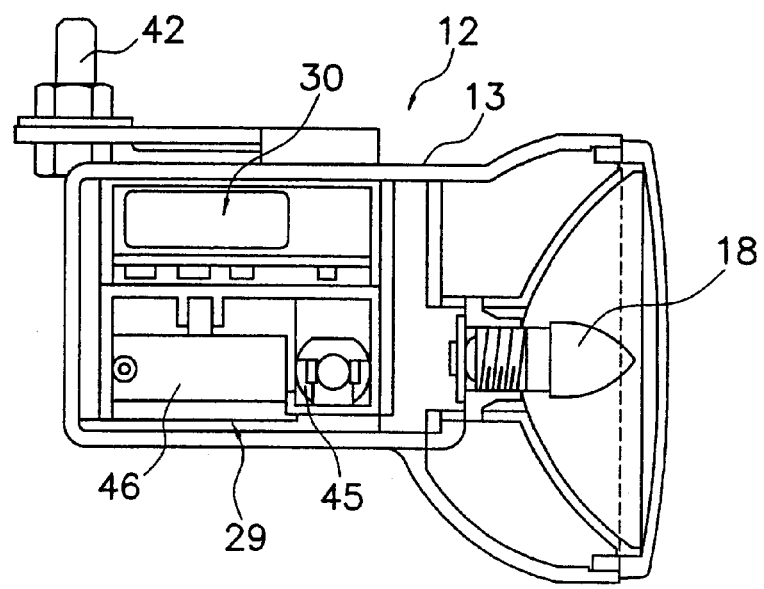
FIG. 4 is a top cross sectional view of the shift control unit shown in FIG. 2.

As shown in FIGS. 3 and 4, the shift control unit 12 comprises a headlight case 13 mounted to a headlight stay 3a located midway along the front fork 3 for housing a headlight 18. The motor unit 29 and a circuit unit 30 are housed in the headlight case 13. The motor unit 29 comprises an electric shifting motor 45, a cable operating component 46 which moves into three shifting positions by means of the shifting motor 45, and a position sensor 47 (FIG. 6) to detect the shift position of the cable operating component 46. One end of the shift control cable 42 is connected to this cable operating component 46. The circuit unit 30 comprises a control unit 25 (FIG. 6) containing a microcomputer comprising a CPU, RAM, ROM, and an I/O interface.

Figure 5:
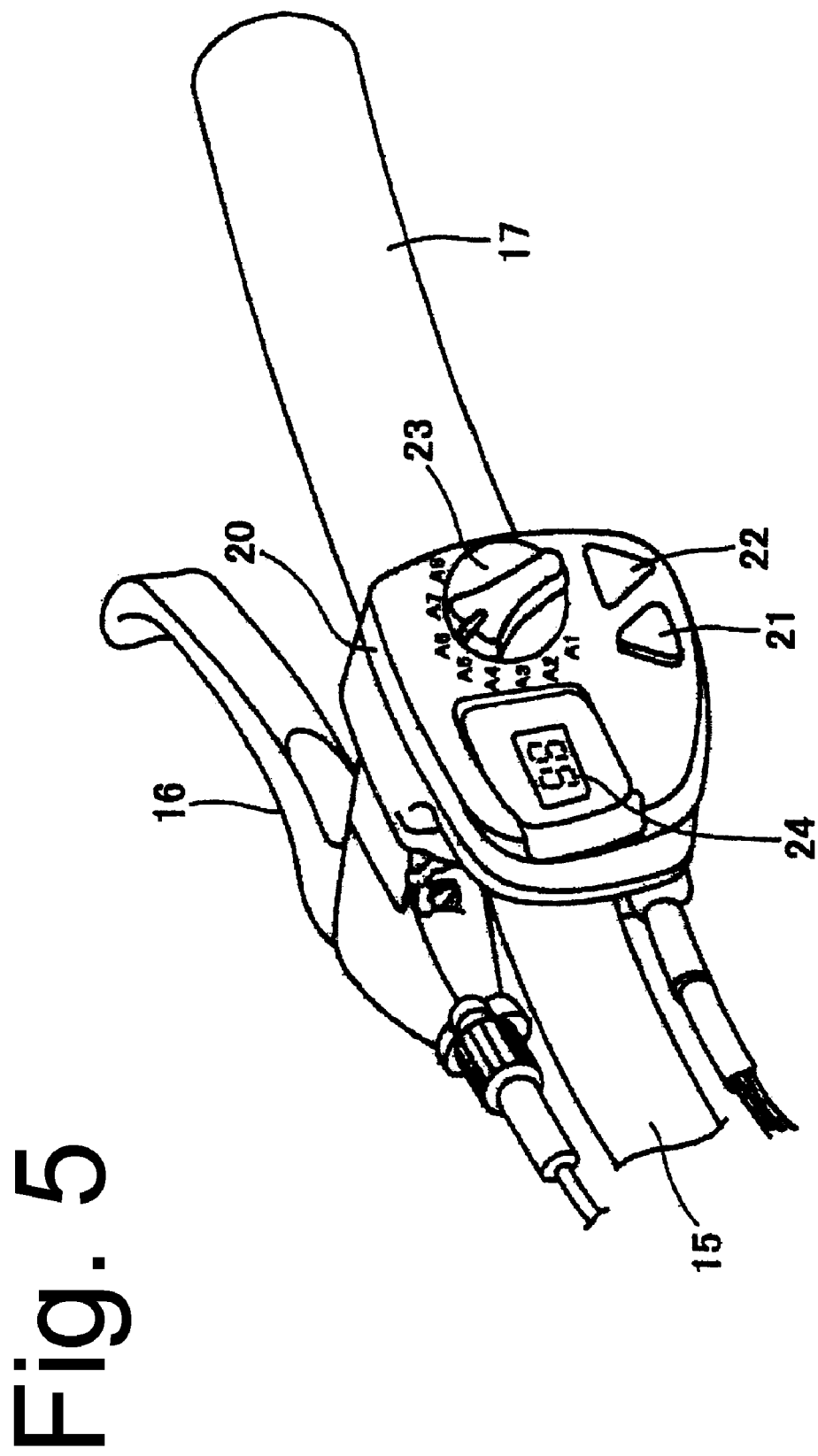
FIG. 5 is a perspective view of the shift controller.

As shown in FIG. 5, the shift controller 20 comprises two operating buttons 21 and 22 in the form of triangular pushbuttons disposed next to each other, an operating dial 23 disposed above the operating buttons 21 and 22, and a liquid crystal display device 24 disposed to the left of the operating dial 23 for displaying information such as current gear and speed. The operating button 21 on the left side may be used for manually shifting from the low speed step to the intermediate speed step and to the high speed step. The operating button 22 on the right side may be used for manually shifting from the high speed step to the intermediate speed step and to the low speed step. Operating buttons 21 and 22 also may be used to set limits on the gears that may be used. For example, the system may be set such that only the low and intermediate speeds may be used, only the intermediate and high speed ranges may be used, only the low speed range may be used, and so on. The operating dial 23 is used for switching between eight automatic shifting modes (A1–A8), using eight detent positions. The eight automatic shifting modes (A1–A8) are modes for automatically shifting the internal shifting hub 10 according to a bicycle speed signal derived from the alternating current generating dynamo 19. The eight automatic shifting modes (A1–A8) are designed to allow shift timing (i.e., the threshold speed values at which shifting will occur) to be automatically changed during upshifting (shifting from low speed to high speed) or downshifting (shifting from high speed to low speed) to accommodate rider preference and physical capability.

Figure 6:
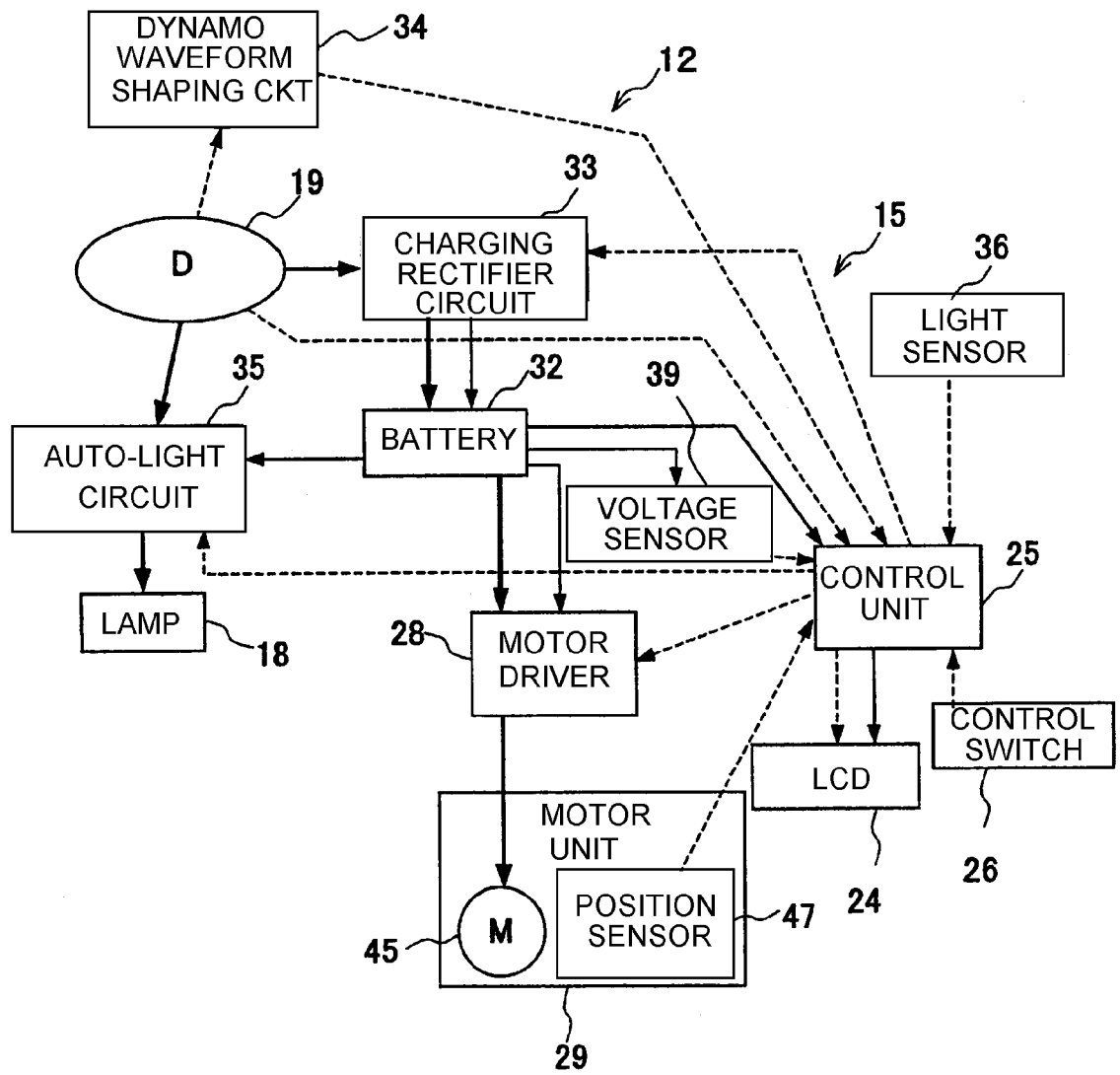
FIG. 6 is a schematic block diagram of the overall bicycle control system.

FIG. 6 is a block diagram illustrating the structure of the overall bicycle control system. Heavy lines in FIG. 6 indicate lines carrying about 1 A of current, solid lines indicate lines carrying about 5 mA of current, and dotted lines indicate signal lines. Control unit 25 is operatively coupled to an operating switch 26 (which schematically represents the operating dial 23 and operating buttons 21 and 22 in the shift controller 20); to the liquid crystal display device 24; to a dynamo waveform shaping circuit 34 that generates a speed signal derived from the output of the alternating current generating dynamo 19; to a charging rectifier circuit 33; to a power storage element or battery unit 32 (e.g., a capacitor); to a voltage sensor 39 for sensing the voltage of battery unit 32; to a light sensor 36 (illumination sensor); to an auto light circuit 35 for controlling the headlight 18; to a motor driver 28; and to the position sensor 47 of the motor unit 29.

Motor driver 28 operates on a 1 mA current supplied by battery unit 32, and it controls a 1 A current supplied by the power storage element 32 to operate the shifting motor 45. Motor driver 28 is equipped with three operating modes for shifting motor: forward rotation, reverse rotation, and braking. In addition to braking the shifting motor 45, the braking mode may be used to intentionally decrease the voltage of battery unit 32 in a manner discussed below.

Control unit 25 is a programmed unit that automatically controls shifting of the internal shifting hub 10 via motor driver 28 according to travel speed. A separate control unit (not shown) uses information sent from control unit 25 to control liquid crystal display device 24 disposed in the shift controller 20. The control unit 25 also controls the headlight 18 by turning it on when surrounding light conditions fall below a certain prescribed brightness, and by turning it off when surrounding light conditions are above the prescribed brightness. In this embodiment, control unit 25 operates in either a normal mode or a power conservation mode. In power conservation mode, neither the liquid crystal display device 24 nor motor unit 29 is operated.

The charging rectifier circuit 33 comprises, for example, a half-wave rectifier circuit that rectifies an alternating current output from the alternating current generating dynamo 19 to 1A and 5 mA direct currents (for example). The battery unit may 32 comprise, for example, a high-capacity capacitor (e.g., an electric double layer capacitor) that stores the direct current power that is output from the charging rectifier circuit 33. The battery unit 32 also may comprise other capacitors, such as an electrolytic capacitor, or secondary batteries such as nickel cadmium batteries, lithium ion batteries, nickel-metal hydride batteries, etc., in lieu of a capacitor.

Battery replacement and recharging are unnecessary because the power storage element 32 stores electrical power from the alternating current generating dynamo 19, and components such as the control unit 25 are operated using this electrical power. Monitoring remaining battery power and carrying along spare batteries also become unnecessary, and shifting can be done automatically without performing the cumbersome procedures required by conventional power sources. The electrical power from the alternating current generating dynamo 19, which conventionally is not employed in the daytime, can be put to effective use in the shift control unit 12.

Voltage sensor 39 senses the voltage of battery unit 32 and provides this information to control unit 25. Control unit 25 uses the voltage information to control charging rectifier circuit 33 as well as motor driver 28 and liquid crystal display 24 when bicycle 1 is stopped in a manner discussed below.

The dynamo waveform shaping circuit 34 forms a speed signal from the alternating current output from the alternating current generating dynamo 19. More specifically, a half-cycle is extracted from a sine wave alternating current signal, passed through a Schmitt circuit or other appropriate waveform shaping circuit, and formed into a pulse signal corresponding to speed. Control unit 25 uses this signal to control the automatic shifting of the internal shifting hub 10 without requiring a separate speed sensor. Control unit 25 also uses this signal to calculate speed and distance and to determine whether the bicycle is in a stopped condition for a predetermined time interval (e.g., 15 minutes).

The auto light circuit 35 supplies or interrupts the 1 A current output from the alternating current dynamo 19 to the headlight 18 in response to on/off signal output from the control unit 25. Control unit 25 generates these signal based on the signals from the light sensor 36 in such a manner that the headlight 18 is switched on automatically when light levels fall below a prescribed limit, and it is switched off when light levels exceed the prescribed limit. In this embodiment, headlight 18 is operated from the alternating current generating dynamo 19 so that the current draw is less apt to adversely affect the battery unit 32, but this is not necessary.

Bicycle speed is detected based on the alternating current signal output from the alternating current generating dynamo 19, and shifting is controlled according to the detected bicycle speed and the selected shifting mode. Because alternating current generating dynamos generally have a plurality of circumferentially disposed magnetic poles, the alternating current generating dynamo 19 outputs an alternating current signal with a frequency related to the bicycle speed and the number of magnetic poles. Consequently, it is possible to obtain a larger number of signal pulses from the alternating current signal during each wheel rotation in comparison with a speed signal obtainable, for example, from a conventional speed sensor that detects a magnet mounted to the bicycle wheel. Therefore, the bicycle speed can be accurately detected within the space of one wheel rotation, and shifting can be controlled in real time with high precision. Furthermore, since shifting is controlled based on the alternating current signal from the alternating current generating dynamo 19, it is no longer necessary to dispose the shift control unit 12 in the vicinity of the bicycle wheel. No limitation is placed on the mounting position of the shift control unit 12.

Figure 7:
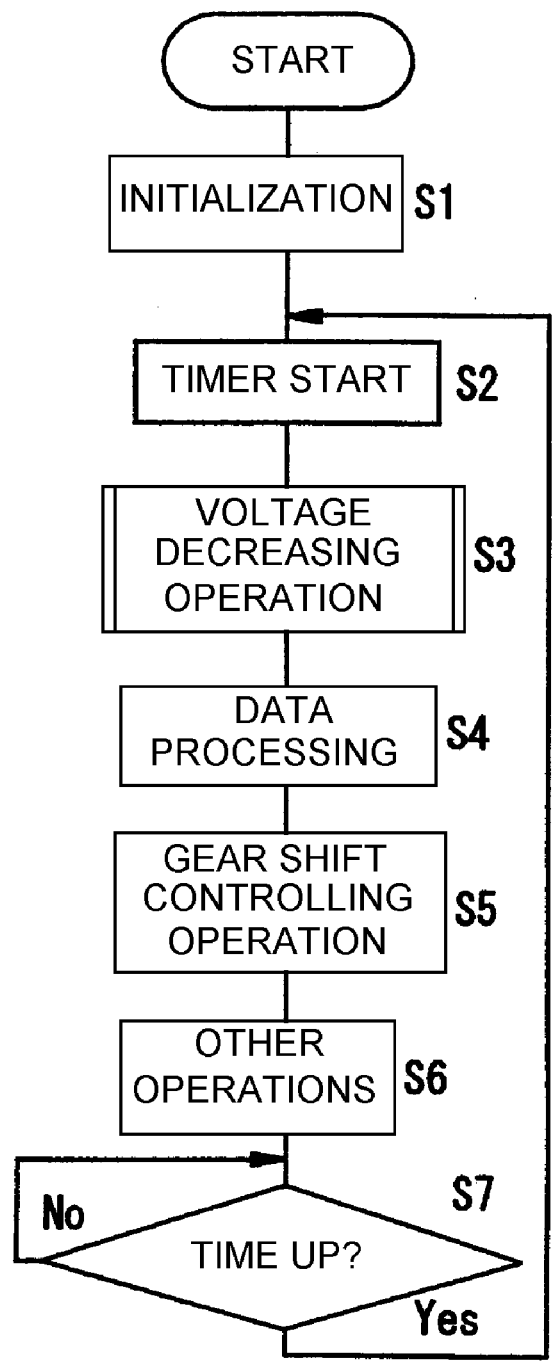
FIG. 7 is flow chart of a particular embodiment of a main routine for the control unit.
Figure 8:
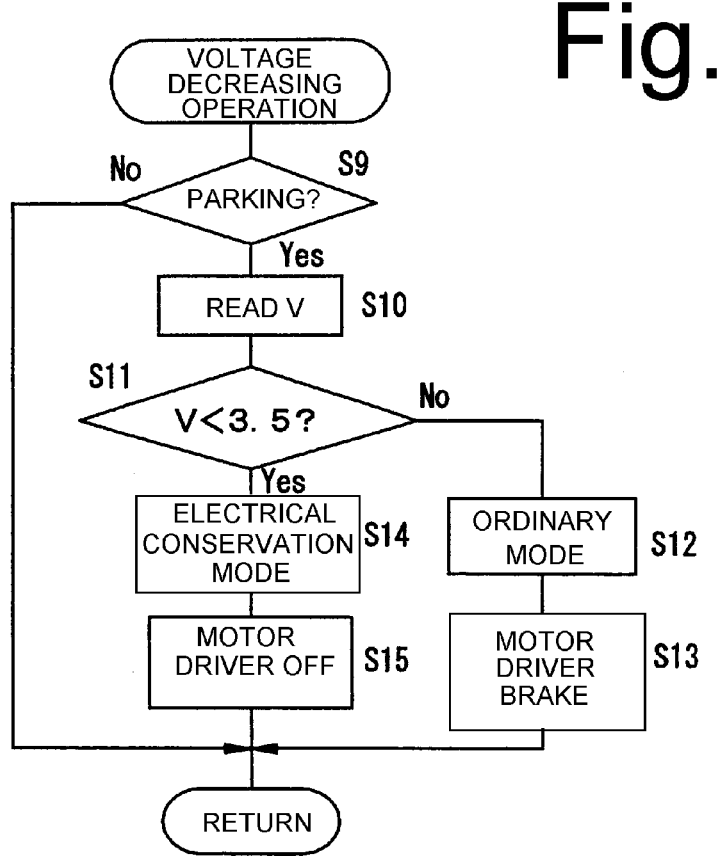
FIG. 8 is a flowchart of a particular embodiment of a voltage decreasing operation.

The operation of control unit 25, and particularly those performed when parking the bicycle, may be understood from the flowcharts shown in FIGS. 7 and 8. When the bicycle begins running, battery unit 32 is charged from the signals received from alternating current generating dynamo 19 through charging rectifier circuit 33. When the voltage of battery unit 32 reaches a predetermined level, control unit 25 begins operation and performs an initialization operation in Step S1. For example, the system may be set to a normal mode of operation, and the shift mode may be set as selected by operating dial 23.

In Step S2, a timer that determines the per-cycle operation time of the microcomputer is started. In Step S3, a voltage decreasing operation shown in FIG. 8 is performed. The voltage decreasing operation decreases the voltage of battery unit 32 to prevent a reduction of battery life when the bicycle is stopped for a predetermined time interval, such as when the bicycle is parked. In Step S4, various types of data processing are conducted. Such data processing may include the calculation of speed, distance, etc., based on the pulse signals received from dynamo waveform shaping circuit 34. In Step S5, a gear shift controlling operation is performed. In this operation, control unit 25 automatically controls motor 45 in motor unit 29, to place internal shifting hub 10 in the appropriate gear based on bicycle speed. Alternatively, internal shifting hub 10 may be commanded to upshift or downshift to an appropriate gear by pressing operating buttons 21 and 22. In Step S6, other operations are performed. Such operations may include displaying selected information on liquid crystal display 24, controlling the operation of the lamp 18, and controlling the operation of charging rectifier circuit 33. In Step S7, the timer started in Step S2 awaits the end of the processing cycle, whereupon the process returns to Step S2.

FIG. 8 is a flowchart of a particular embodiment of the voltage decreasing operation of Step S3 in FIG. 7. Initially, control unit 25 determines whether or not the bicycle is in a parked condition in Step S9. In other words, control unit 25 functions as a bicycle condition detecting unit. In this embodiment, the bicycle is considered to be in a parked condition when pulse signals are not received from dynamo waveform shaping circuit 34 for more than a predetermined time interval, such as 15 minutes. If the bicycle is not in a parked condition, then processing returns to the main routine.

If it is determined in Step S9 that the bicycle is in a parked condition, then the voltage V of battery unit 32 is read from voltage sensor 39 in Step S10. It is then determined in a Step S11 whether or not the voltage V is less than 3.5 V. If not, then the system is placed in a normal operating mode such that liquid crystal display 24 is turned on to display selected information, and the motor driver 28 is placed in a braking mode. Control unit 25 functions as a voltage decreasing unit in the form of a current drawing unit in this situation. Both of these operations cause current to be drawn from battery unit 32, even through current usually does not need not be drawn from these elements when the bicycle is parked. This, in turn, reduces the voltage of battery unit 32 to conserve battery life even when temperatures are elevated. Thereafter, processing returns to the main routine.

On the other hand, if it is determined in Step S11 that the voltage of battery unit 32 is below 3.5V, then the system enters a power conservation mode wherein liquid crystal display 24 is turned off in Step S14, and motor driver 28 is turned off in Step S15. Both of these steps conserve battery power. As a result of the foregoing algorithm, a reduction in battery life may be avoided while conserving power so that control unit 25 may quickly resume operation when the bicycle resumes traveling.

Figure 9:
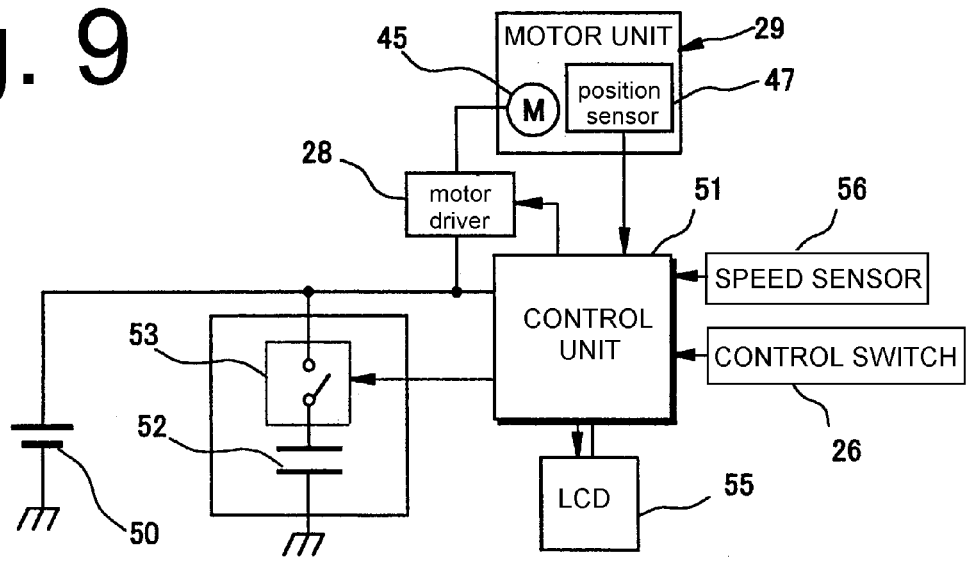
FIG. 9 is a schematic block diagram of an alternative embodiment of an overall bicycle control system.

In the above embodiment, alternating current generating dynamo 19 was used as the power supply that charged battery unit 32. However, the teachings herein also may be applied to devices that use direct voltage sources such as batteries. FIG. 9 is a schematic block diagram of an alternative embodiment of an overall bicycle control system that uses such batteries. As shown in FIG. 9, a control unit 51 is connected to a main battery 50 and is powered thereby. A battery unit 52 is connected in parallel with battery 50 and is charged thereby through a serially connected switch 53 (which also may be called a first switch in view of a later embodiment described below). Battery unit 52 may comprise a large-capacity capacitor, such as an electrical double layer capacitor. One terminal of battery unit 52 is connected to switch 53, and the other terminal of battery unit 52 is coupled to a ground potential. The power stored in battery unit 52 is supplied to control unit 51 and motor driver 28.

Switch 53 turns on and off the electricity supplied from battery 50 to battery unit 52 in response to command signals from control unit 51. Switch 53 may comprise relays, transistors, field effect transistors (FET"s), thyristors, photodiodes, and so on. In this embodiment, switch 53 is turned off by control unit 51 when the bicycle is in a parked condition, thus disconnecting battery unit 52 from battery 50 and control unit 51. As a result, battery unit 52 self-discharges through the ground potential, thus decreasing its voltage.

As in the previous embodiment, control unit 51 comprises a microcomputer with a CPU, RAM, ROM, and I/O interface, and it is programmed to control motor unit 29 and the other elements in a manner similar to that discussed above for the first embodiment. In addition to the components described immediately above, control unit 51 is coupled to a control switch 26 (e.g., operating dial 23 and operating buttons 21 and 22 as in the first embodiment), a liquid crystal display 55, a speed sensor 56, motor driver 28 and position sensor 47 in motor unit 29. Speed sensor 56 may comprise, for example, one or more magnets mounted to one of the bicycle wheels and a magnet sensor such as a reed switch or hall-effect element mounted on the frame body 2 or front fork 3 and positioned to detect the passage of the magnet and output detection pulses in a conventional manner. In this embodiment, control unit 51 may be housed within a gear shifter unit (not shown) attachable to the bicycle handlebar 15 together with motor driver 28, motor unit 29, battery 50, battery unit 52, and switch 53.

Figure 10:
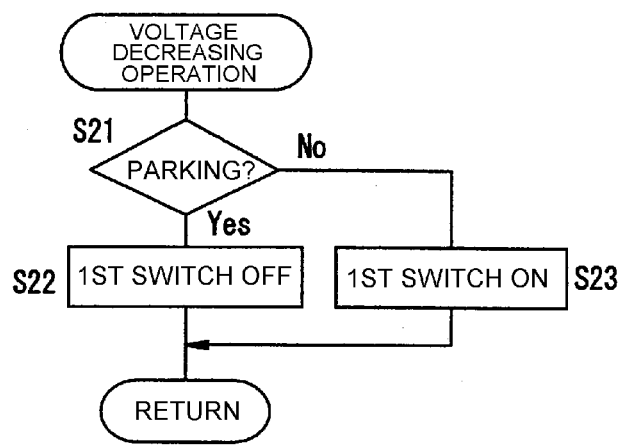
FIG. 10 is a flowchart of a particular embodiment of a voltage decreasing operation for the embodiment shown in FIG. 9.

The main routine operations of control unit 51 are substantially identical to the first embodiment shown in FIG. 7, so only a voltage decreasing operation shown in FIG. 10 will be described. As in the first embodiment, it is first determined in Step S21 whether or not the bicycle is in a parked condition. This may be ascertained by whether or not pulses are received from speed sensor 56 over a predetermined period of time (e.g., 15 minutes). If the bicycle is in a parked condition, then switch 53 is turned off in Step S22. As a result, as noted above, battery unit 52 is disconnected from battery 50 and control unit 51, and battery unit 52 self discharges. The voltage of battery unit gradually decreases, thus making it possible to prevent a reduction in the life of battery unit 52 even if it is subjected to high temperatures during parking. On the other hand, if it is determined in Step S21 that the bicycle is not in a parked condition, then processing proceeds to Step S23, switch 53 is turned on, and power from battery 50 is stored in battery unit 52.

Figure 11:
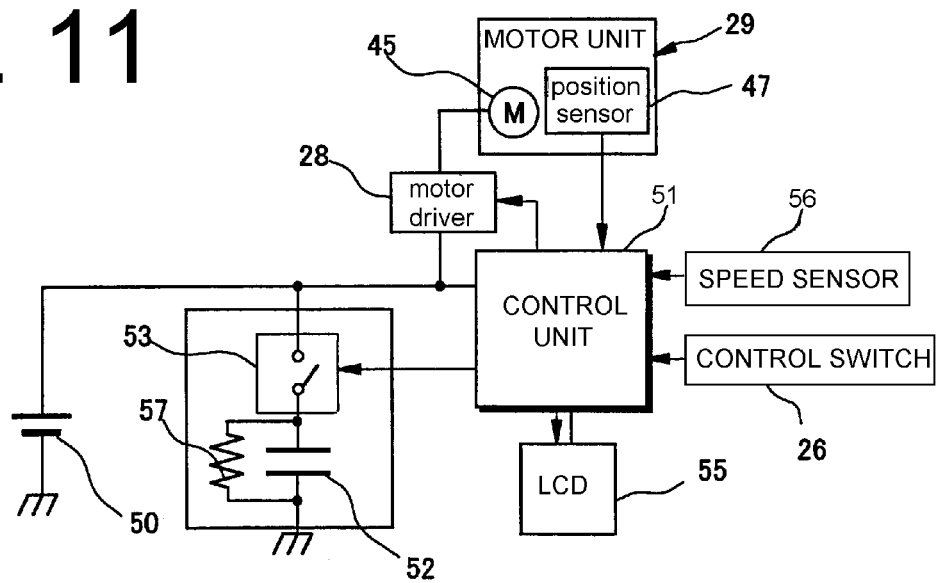
FIG. 11 is a schematic block diagram of another alternative embodiment of an overall bicycle control system.

FIG. 11 is a schematic block diagram of another alternative embodiment of an overall bicycle control system. This system is similar to the system shown in FIG. 9, except that a resistance such as a resistor 57 is coupled in parallel with battery unit 32. Resistor 57 functions as a load to consume electricity more rapidly in the event that the battery unit 52 shown in FIG. 9 does not self discharge as rapidly as desired.

Figure 12:
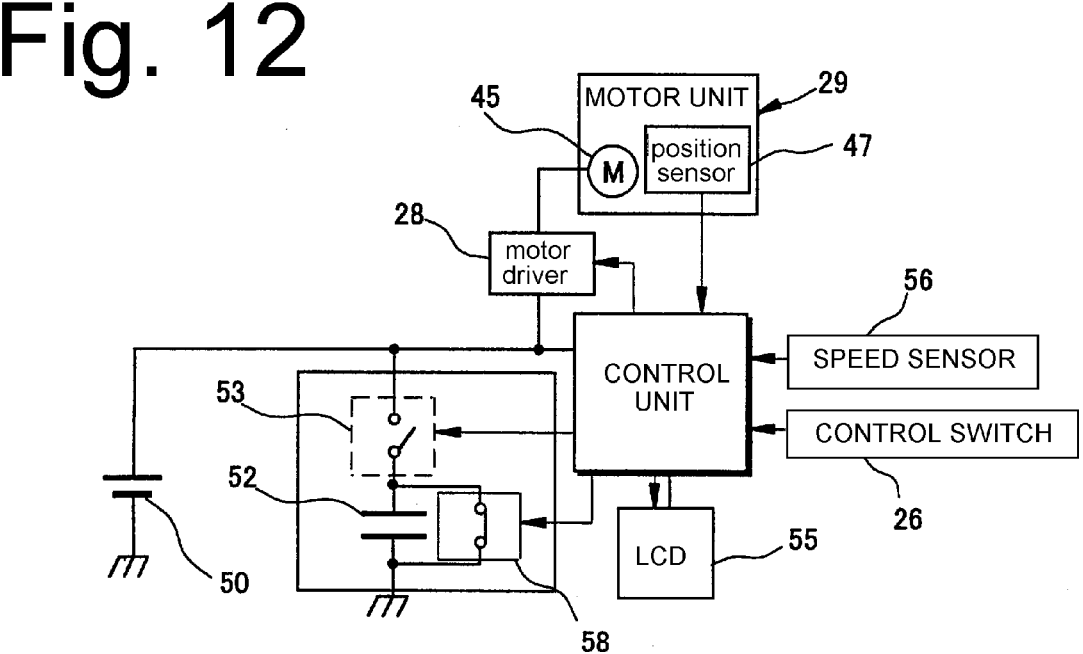
FIG. 12 is a schematic block diagram of another alternative embodiment of an overall bicycle control system.
Figure 13:
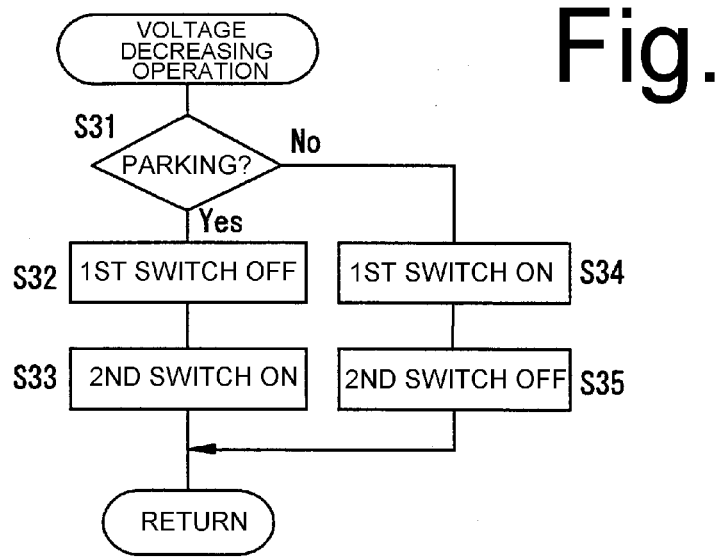
FIG. 13 is a flowchart of a particular embodiment of a voltage decreasing operation for the embodiment shown in FIG. 12.

FIG. 12 is a schematic block diagram of another alternative embodiment of an overall bicycle control system. As shown therein a second switch 58 may be coupled in parallel with battery unit 52 in place of the resistor 57 shown in FIG. 11, thus making it possible to discharge battery unit 32 even more rapidly. The voltage decreasing operation of this system is shown in FIG. 13. As shown therein, it is first determined in a Step S31 whether or not the bicycle is in a parked condition in the same manner as previously described. If so, then the first switch 53 is turned off in a Step S32 and the second switch 33 is turned on in a Step S33. As a result, battery unit 52 is disconnected from battery 50 and control unit 51, and battery unit 52 rapidly discharges through second switch 58. If it is determined in Step S31 that the bicycle is not in a parked condition, then the first switch 53 is turned on in a Step S34, and the second switch 58 is turned off in a Step S35. As a result, wasteful electrical consumption does not occur when the bicycle is moving.

Figure 14:
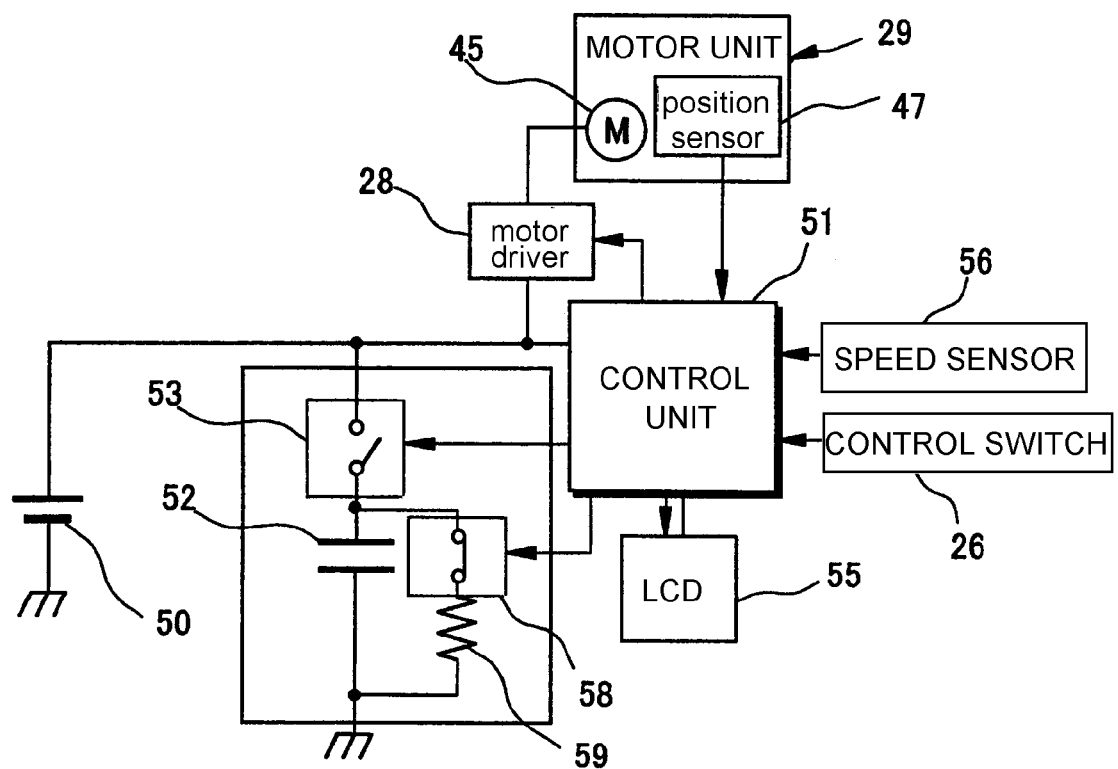
FIG. 14 is a schematic block diagram of another alternative embodiment of an overall bicycle control system.

FIG. 14 is a schematic block diagram of another alternative embodiment of an overall bicycle control system. This embodiment is substantially identical to the embodiment shown in FIG. 12, except that a second resistance such as a resister 59 is coupled in series with second switch 58. As a result, power stored in battery unit 52 is consumed also by second resistance 59, which provides for accelerated voltage decrease, but not as fast as the embodiment shown in FIG. 12.

While the above is a description of various embodiments of the present invention, further modifications may be employed without departing from the spirit and scope of the present invention. For example, while the embodiments other than the first embodiment did not use a voltage sensor to monitor the voltage decreasing operation, such a voltage sensor could be provided, if desired. In this case, switch 53 may be turned off until the desired voltage is reached.

While the voltage decreasing operation was performed when the bicycle was in a parked condition, the voltage decreasing operation could be performed based on signals from a temperature sensor that detects the temperature of the battery unit. For example, the voltage decreasing operation could be performed when the temperature of the battery unit exceeds a predetermined value while the bicycle is parked.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

The invention claimed is:

1. A bicycle power supply apparatus comprising
   A battery unit,
   A bicycle condition detecting unit that detects when the bicycle is in a selected condition that ordinarily does not require drawing current from the battery unit for powering a current-drawing element, and,
   A voltage decreasing unit that decreases voltage of the battery unit when the selected condition is detected by providing a signal to activate the current-drawing element to draw current from the battery unit to cause the voltage of the battery to decrease.

2. The apparatus according to claim 1 wherein the selected condition is a stopped condition of the bicycle.

3. The apparatus according to claim 2 wherein the selected condition is a stopped condition of the bicycle for a predetermined time interval.

4. The apparatus according to claim 1 further comprising a voltage sensor operatively coupled to the battery unit and to the voltage decreasing unit to provide voltage information to the voltage decreasing unit.

5. The apparatus according to claim 4 wherein the voltage decreasing unit provides a signal to activate the current drawing unit to cause current to be drawn from the battery unit when the bicycle condition detecting unit detects the selected condition until the voltage sensor senses a predetermined voltage.

6. The apparatus according to claim 1 wherein the voltage decreasing unit turns on a display powered by the battery unit to draw current from the battery unit.

7. The apparatus according to claim 1 wherein the voltage decreasing unit turns on a motor driver powered by the battery unit to draw current from the battery unit.

8. The apparatus according to claim 1 wherein the battery unit is structured to be charged from a power supply adapted to be mounted to the bicycle.

9. The apparatus according to claim 8 wherein the battery unit is structured to be charged from an alternating current generator.

10. The apparatus according to claim 8 wherein the battery unit is structured to be charged from a separate battery.

11. The apparatus according to claim 8 further comprising an input switch coupled to a first battery terminal of the battery unit to communicate current from the power supply to the battery unit, wherein the current drawing unit opens the input switch when the bicycle condition detecting unit detects the selected condition.

12. The apparatus according to claim 11 wherein the battery unit has a second battery terminal coupled to a ground potential.

13. The apparatus according to claim 8 further comprising a current flowing device coupled to a first battery terminal of the battery unit to flow current away from the first battery terminal.

14. The apparatus according to claim 13 wherein the current flowing device comprises a resistance having a first resistance terminal coupled to the first battery terminal.

15. The apparatus according to claim 14 wherein the battery unit has a second battery terminal coupled to a ground potential, and wherein the resistance has a second resistance terminal coupled to the ground potential.

16. The apparatus according to claim 13 wherein the current flowing device comprises a switch coupled to the first battery terminal.

17. The apparatus according to claim 16 wherein the current drawing unit closes the switch when the bicycle condition detecting unit detects the selected condition.

18. The apparatus according to claim 17 further comprising a resistance coupled in series with the switch.

19. The apparatus according to claim 18 wherein the battery unit has a second battery terminal coupled to a ground potential, and wherein the resistance is coupled in series between the switch and the ground potential.

20. The apparatus according to claim 17 further comprising an input switch coupled to the first battery terminal to communicate current from the power supply to the battery unit, wherein the current drawing unit opens the input switch when the bicycle condition detecting unit detects the selected condition.

* * * * *